United States Patent [19]

Lawrence et al.

[11] Patent Number: 4,463,247

[45] Date of Patent: Jul. 31, 1984

[54] SOLDERING IRON HAVING ELECTRIC HEATER UNIT WITH IMPROVED HEAT TRANSFER CHARACTERISTICS

[75] Inventors: William Lawrence, Palos Verdes Estates; Jack Gaines, Long Beach, both of Calif.

[73] Assignee: Eldon Industries, Inc., Inglewood, Calif.

[21] Appl. No.: 446,862

[22] Filed: Dec. 6, 1982

[51] Int. Cl.³ .............................. B23K 3/02; H05B 3/00
[52] U.S. Cl. ..................................... 219/236; 219/229; 219/239; 228/51
[58] Field of Search ................ 219/236–239, 219/240, 241, 227, 229, 533; 228/51-55

[56] References Cited

U.S. PATENT DOCUMENTS

| | | | |
|---|---|---|---|
| 871,405 | 11/1907 | Hertzberg et al. | 219/239 X |
| 912,765 | 2/1909 | Wohl et al. | 219/239 X |
| 973,592 | 10/1910 | Van Aller | 219/237 X |
| 1,316,368 | 9/1919 | Kuhn et al. | 219/238 |
| 1,320,156 | 10/1919 | Kuhn et al. | 219/530 X |
| 2,224,583 | 12/1940 | Abbott | 219/239 |
| 3,518,407 | 6/1970 | Andrich | 219/241 X |
| 3,584,190 | 6/1971 | Marcoux | 219/241 X |
| 4,082,940 | 4/1978 | Knowles et al. | 219/237 X |

FOREIGN PATENT DOCUMENTS

| | | | |
|---|---|---|---|
| 878917 | 11/1942 | France | 219/238 |
| 451528 | 9/1949 | Italy | 219/237 |
| 79681 | 2/1969 | Switzerland | 219/238 |
| 564005 | 9/1944 | United Kingdom | 219/238 |
| 2064396 | 6/1981 | United Kingdom | 219/237 |

Primary Examiner—A. Bartis
Attorney, Agent, or Firm—K. H. Boswell; Edward D. O'Brian

[57] ABSTRACT

An electric soldering iron includes an elongated metal housing tube enclosing a metallic heat conducting member having a first zone snugly fit within the housing and having a portion projecting out of the front end thereof for removably receiving a soldering tip. A second zone of the member extends rearwardly from the first zone and has a smaller cross section than the interior of the tube to create an insulating space therebetween. The heat conducting member is formed with an opening sized and shaped to receive the end of an elongated flat ceramic heater having embedded therein an electric heating element. The portion of the ceramic heater not located within the heat conducting member is surrounded and positioned by a refractory heat insulating tube abutting the rear end of the heat conducting member. The other end of the tube is closed by a male electrical terminal unit adapted to be removably connected to a female terminal unit at the front end of a soldering iron handle for mechanically attaching the heating unit to the handle and electrically connecting the heating element of the ceramic heater to power supply wires in the handle. Since the heat conducting member engages the housing tube only at the end where the tip is attached heat is preferentially directed to the tip. The space formed by the second zone of the heat conducting member and the provision of the refractory tube thermally insulates the housing tube form the ceramic heater and further reduces the transfer of heat to the handle.

5 Claims, 4 Drawing Figures

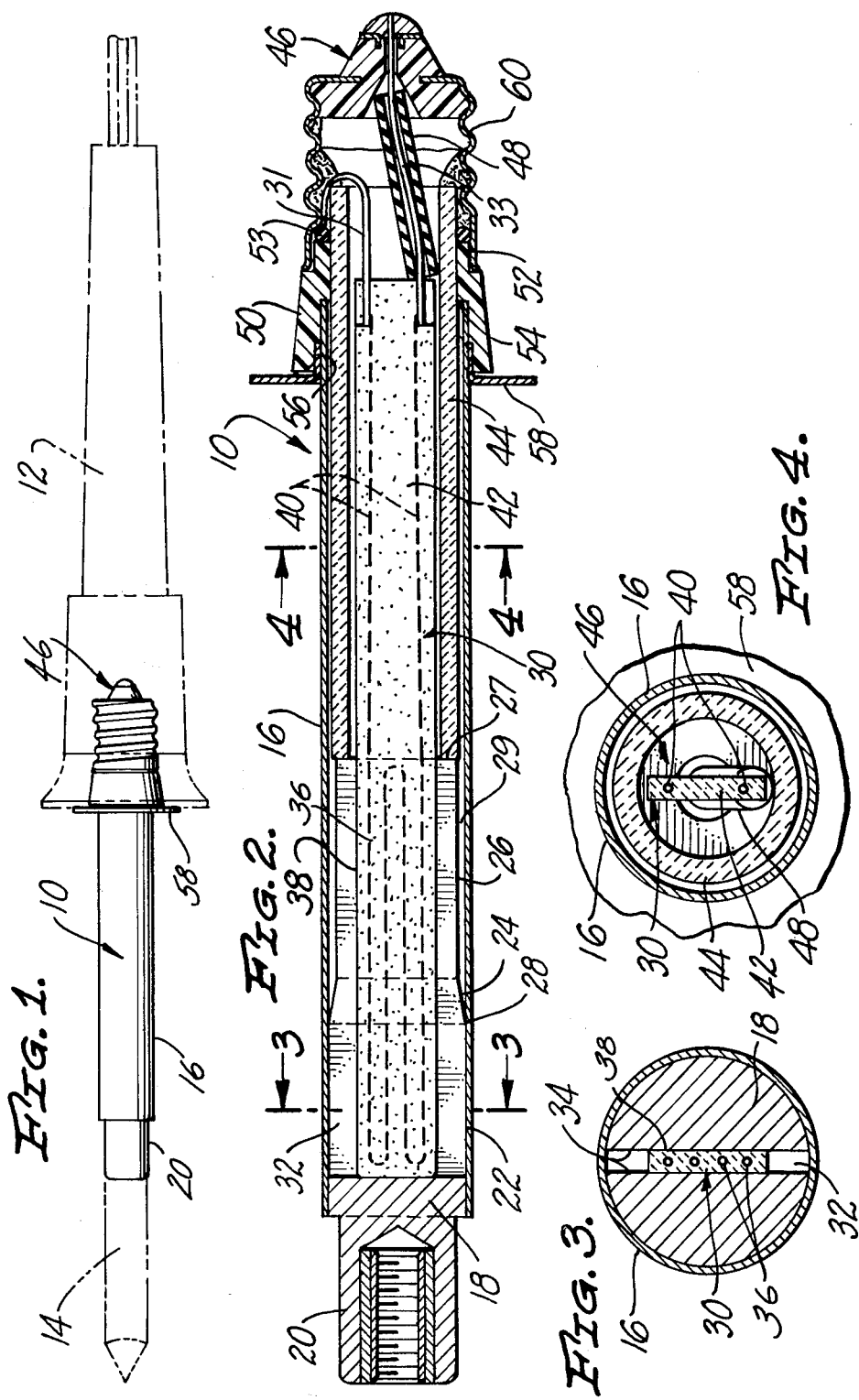

SOLDERING IRON HAVING ELECTRIC HEATER UNIT WITH IMPROVED HEAT TRANSFER CHARACTERISTICS

BACKGROUND OF THE INVENTION

This invention is directed to an improvement in an electric soldering iron wherein a heating element having improved heat transfer characteristics is constructed using a blade heater surrounded by a conducting rod which results in an increase in the area of intimate contact between the conducting rod and the heater surface. The increased area of intimate contact between the conducting rod and the heater surface allows more efficient heat transfer than is possible with an assembly having a smaller heat transfer area.

Presently existing soldering irons incorporate a thermal mass in association with a heating element. The heating element is usually a coil of high resistance wire of circular cross section. Because of the circular cross section of the wire, the surface area of the heating element available for heat transfer per unit volume is low. The coiled shape of the heating element further exacerbates this problem by decreasing the surface area in proximity to the thermal mass. Together these two factors greatly limit the amount of surface area available for heat transfer and limit the efficiency of such heat transfer. Consequently, to maintain a specific working temperature a large thermal mass is employed to act as a heat reservoir. The time required to heat the large thermal mass introduces a lag time between heating the element and the soldering iron tip. A corresponding lag time is involved in cooling the iron off.

The presence of the large thermal mass coupled with inefficient heat transfer to the soldering iron tip causes heat transfer to the handle and ultimately to the user's hand, unless sufficient insulation is provided. The large thermal mass and the necessary insulation tend to make such tools bulky and undesirable for extended use or precision applications.

The heating and cooling lag times make it impractical to turn the iron off during intermittent use. Maintaining the soldering iron at its working temperature during idle periods results in higher energy usage. This, in turn, results in higher energy costs.

The large thermal mass also makes it harder to limit heat transfer to the soldering site. This is an important consideration during the assembly of electronic components. These components are usually attached to circuit boards by soldering. Many electronic components which are installed by soldering are damaged or destroyed by heat. Modern practices require an efficient use of circuit board space and consequently electronic components are arranged in high density on circuit boards. Consequently, it is critically important that heat not be transferred from the leads to the body of the electrical component being installed, nor to any adjacent components.

BRIEF SUMMARY OF THE INVENTION

In view of the above it is an object of this invention to provide a soldering iron heating unit having superior heat transfer properties and a low thermal mass. The heat transfer properties of the soldering iron heating unit are improved by increasing the surface area per unit volume of the heating element and by bringing more of the heater surface into close contact with the thermal mass.

The present invention is directed to an apparatus which includes at least one elongated heating element together with a heat conducting mass having at least one opening capable of receiving at least one heating element. The configuration increases the heat transfer surface of the heater and the thermal mass over the heat transfer surface available in a conventional arrangement. The increase in area available for heat transfer results in a greater efficiency of heat transfer. This increased efficiency of heat transfer reduces the time required to bring the soldering iron tip up to working temperature. Since the available heat is more efficiently transferred, less power is required to reach a given temperature and the faster recovery time makes it possible to use a lower power heater than in a conventional apparatus for the same load. The faster recovery time also makes turning the iron off during intermittent uses practical. All of these factors result in a decreased consumption of electrical power over that of conventional apparatus, and a corresponding reduction in costs.

Heat transferred to the soldering iron tip and away from the user's hand is further enhanced by attaching the thermal mass to the heater unit housing only at the end of the mass where the soldering iron tip is attached. The heater or heaters are positioned in a thermal mass by tubes of non-conducting material at the end of the heater furthest from the soldering iron tip.

BRIEF DESCRIPTION OF THE DRAWINGS

The invention can be better understood by referring to the accompanying drawings which show a preferred embodiment of the invention:

FIG. 1 is an elevational view of a soldering iron heating unit illustrated in association with a conventional soldering iron handle and tip which are shown in phantom lines;

FIG. 2 is an elevational view in section of the soldering iron heating unit of FIG. 1;

FIG. 3 is a sectional view about line 3—3 of FIG. 2;

FIG. 4 is a sectional view about line 4—4 of FIG. 2.

This invention utilizes certain operative principles and/or concepts as are set forth and defined in the claims appended to this specification. Those skilled in the art to which this invention pertains will realize that these principles and/or concepts could be applied to a number of embodiments of different appearance. Therefore, this invention is to be construed in light of the claims appended hereto and is not to be construed as being limited to the exact embodiment described in the specification and illustrated in the drawing.

DETAILED DESCRIPTION OF THE INVENTION

In the figures, FIG. 1 shows an interchangeable soldering iron heating unit 10 in normal relationship to a soldering iron handle unit 12 and a replaceable soldering iron tip 14 as they are assembled together for use as a soldering iron. The soldering iron handle unit 12 and the replaceable soldering iron tip 14 are shown in phantom line in that they do not form a part of this invention, but aid in its understanding.

FIG. 2 shows the construction of the soldering iron heating unit 10. The body of the soldering iron heating unit 10 is a housing tube 16 made of a temperature resistant, durable material. Stainless steel, or other like material, is a preferred choice. A heat conducting member 18 closes one end of the housing tube 16. The heat conducting member 18 has a circular cross section and is preferably constructed from copper or other suitable heat conductive materials. The heat conducting member 18 is divided into four regions, a projection 20 to attach a soldering iron tip 14, a major diameter 22, a tapered shoulder 24 and a minor diameter 26. The major diameter 22 is large enough to insure a snug press fit when inserted into one end of the housing tube 16 and is further secured in this position by welding the housing tube 16 and the major diameter 22 together at their junction. The tapered shoulder 24 contacts the housing tube 16 only at junction 28 with the major diameter 22, tapering down to the minor diameter 26 at the opposite end. This creates a space 29 between the conducting member 18 and the housing tube 16 from the junction 28 to the minor diameter end 27 of the heat conducting member 18. This space 29 insulates the heat conducting member 18 from the housing tube 16 and reduces heat conduction to the soldering iron handle unit 12 and away from the soldering iron tip 14.

The heat conducting member 18 has an opening to receive a blade type heater 30 having two leads 31 and 33 extending from one end. The heater 30 has two zones. The zone nearest to the projection 20 contains the heating elements 36 and is referred to as the heating zone 38. Opposite the heating zone 38 is the insulating zone 42, which protects and carries the internal electrical leads 40. A slot 32 is formed in the heat conducting member 18 to receive the heater 30. The slot 32 must be sufficiently wide to allow entry of the heater 30, but to facilitate efficient heat transfer it must be narrow enough to maintain close surface contact between the heater 30 and the internal faces 34 of the slot 32. For a similar reason, the width of the minor diameter is at least as wide as the blade heater 30.

The depth to which the heater 30 extends into the heat conducting member 18 is controlled by the depth of the slot 32 formed in the heat conducting member 18. To insure efficient heat transfer the slot 32 must be deep enough to let the heating zone 38 of the heater 30 lie completely within the heat conducting member 18. The heater 30 is positioned within the housing tube 16 by a sleeve 44 of refractory material which extends from the minor diameter 26 toward the heater leads 31 and 33. The sleeve 44 lies coaxial with the heat conducting member 18 within the housing tube 16 and surrounds the insulating zone 42 of the heater 30. The sleeve 44 has an outside diameter sufficient to allow it to fit closely within the housing tube 16. Similarly the inside diameter of this sleeve 44 is large enough to admit the heater 30, but small enough to limit movement of the heater 30 in the plane of the slot 32. The ceramic sleeve 44 insulates the housing tube 16 from the heater 30 and impedes transfer of heat to the leads 31 and 33. The void between the heater 30 and the sleeve 44 further insulates the housing tube 16 and the heater leads 31 and 33 from the heater 30.

The heater leads 31 and 33 extend from the end of the heater 30 furthest from the heat conducting member 18 through the ceramic sleeve 44 and out to a candelabra base electrical fitting 46. The lead 33 extending to the center of the candelabra base electrical fitting 46 is shielded from the lead 31 to the outside edge of the candelabra base electrical fitting 46 by a tube 48 of insulating material. This prevents the two leads 31 and 33 from shorting out should they contact each other. The candelabra base electrical fitting 46 is joined to the housing tube 16 through a base guide 50 of insulating material. The base guide 50 has an external shoulder 52 on one end over which the candelabra base electrical fitting 46 fits. A base spacer 53 is inserted between the base guide 50 and the candelabra base electrical fitting 46 to hold one heater lead 31 in electrical contact with the threaded portion 60 of the candelabra base electrical fitting 46. The end of the base guide 50 opposite the candelabra base electrical fitting 46 has two internal shoulders. The small diameter internal shoulder 54 mates with the housing tube 16 and limits its entry into the candelabra base electrical fitting 46. The large diameter internal shoulder 56 holds a flange 58, which faces toward the heat conducting member 18, against the housing tube 16. The flange 58 serves to reflect heat away from the soldering iron handle unit 12 and to radiate any heat conducted to it by the housing tube 16. It also acts as a shield for the threaded portion 60 of the candelabra base electrical fitting 46 and the soldering iron handle unit 12, blocking the entry of debris.

We claim:

1. In an electrical soldering iron having a handle, an electrical heating means, a tip member associated with said heating means so as to receive heat from said heating means and means for supplying electrical current to said heating means, the improvement which comprises:

said heating means including a heating unit, said heating unit having attaching means for connecting said heating unit to said handle;

said handle including receiving means, said receiving means for receiving said connecting means so as to connect said heating unit to said handle;

said heating unit including an elongated housing tube having a front end and a back end, said attaching means located at said back end and enclosing the same;

said heating unit including a heat conducting member, said heat conducting member having at least two zones, a first of said zones sized and shaped so as to snugly fit within the front end of said housing tube, a second of said zones sized and shaped so as to be located within the interior of said housing tube and to extend a portion of the way towards said back end of said housing tube, further said second zone having a cross sectional dimension smaller than the cross sectional dimension of the interior of said tube such that a space is formed between said second zone and the interior of said tube;

at least one elongated ceramic heater having a heating element embedded in one end thereof, said heating element emitting heat upon passage of an electrical current through said heating element;

said heat conducting member including at least one opening sized and shaped so as to receive a portion of said ceramic heater, said ceramic heater located within said housing tube with said end of said ceramic heater wherein said heating element is embedded within said opening;

a heat insulating sleeve sized to fit within said housing tube, said sleeve located around the remaining portion of said ceramic heater which is not located within said opening;

said attaching means including a first pair of electrical terminals, said heating element being electrically connected to said first pair of terminals to receive power therefrom;

said means for supplying electrical current including a second pair of electrical terminals located on said receiving means, said second pair of terminals adapted to mate with said first pair of terminals forming an electrical circuit between said means for supplying electrical current and said heating element;

said heat conducting member including a tip connecting means located thereon and projecting out of said front end of said tube housing, said tip connecting means for receiving said tip member.

2. The soldering iron of claim 1 wherein:

said first pair of terminals comprise male electrical terminals;

said second pair of terminals comprise female electrical terminals;

said male and said female electrical terminals connectable together so as to attach said heating unit to said handle and to form an electrical circuit between said heating element and said means for supplying electrical current.

3. The soldering iron of claim 2 including:

flange means located on said heating unit adjacent to said back end.

4. The soldering iron of claim 1 wherein:

each of said attaching means and said receiving means include threads located thereon whereby said attaching means threads into said receiving means, said first and said second pair of terminals located in association with said threads on said attaching and receiving means respectively whereby said electrical circuit between said means for supplying electrical current and said heating element is completed upon threading said attaching means to said receiving means.

5. The soldering iron of claim 4 wherein:

flange means located on said heating unit adjacent to said back end.

* * * * *